J. R. KUNZELMAN.
CAR STEP.
APPLICATION FILED DEC. 21, 1912.
1,079,565.
Patented Nov. 25, 1913.
2 SHEETS—SHEET 1.
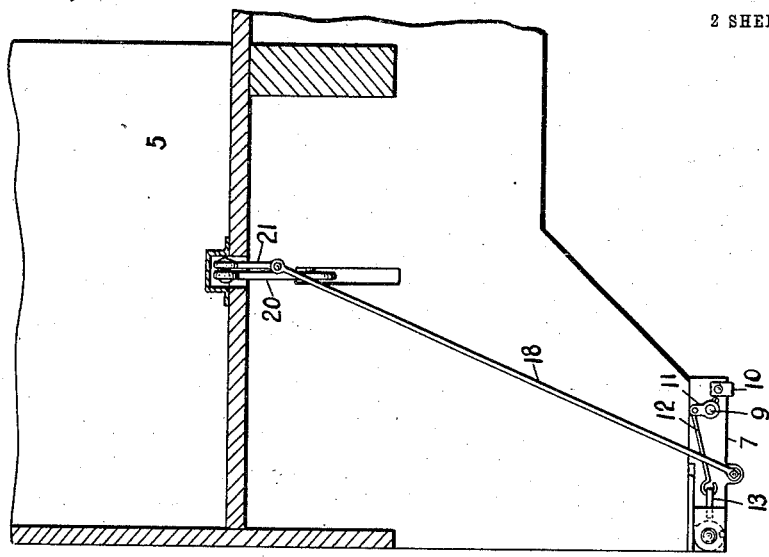
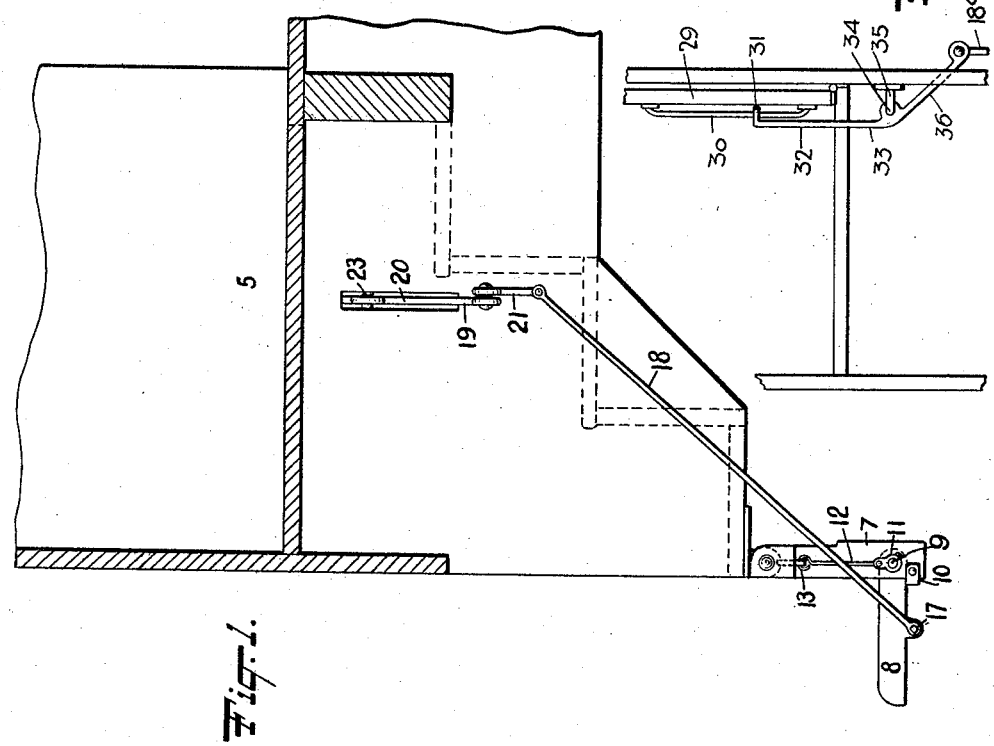
WITNESSES
George Bambay.
E. B. Marshall
INVENTOR
John R. Kunzelman,
BY Munn & Co.
ATTORNEYS

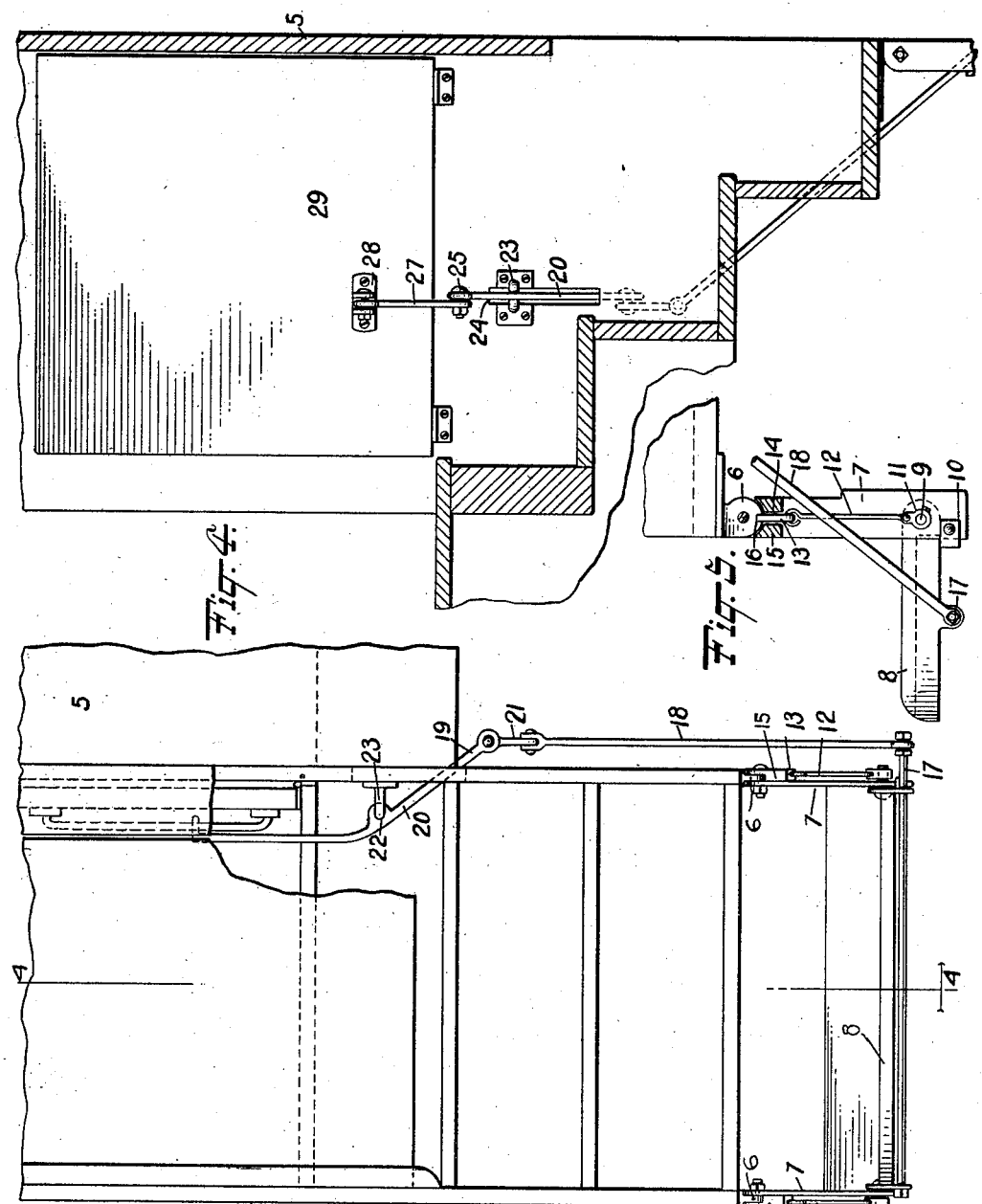

UNITED STATES PATENT OFFICE.

JOHN R. KUNZELMAN, OF DULUTH, MINNESOTA.

CAR-STEP.

1,079,565.  Specification of Letters Patent.  Patented Nov. 25, 1913.

Application filed December 21, 1912. Serial No. 737,972.

*To all whom it may concern:*

Be it known that I, JOHN R. KUNZELMAN, a citizen of the United States, and a resident of Duluth, in the county of St. Louis and State of Minnesota, have invented a new and Improved Car-Step, of which the following is a full, clear, and exact description.

My invention has for its object to provide a car step which may be folded and raised, when not in use, and which may be lowered and unfolded by a trainman on the car platform, when the car comes to a stop.

Another object of the invention is to provide means for automatically locking a member of the step when it is lowered, so that a tread member, carried thereby, will be prevented from moving out of position.

Still another object of the invention is to connect the car step to a trap door on the car platform, so that the car step is lowered when the trap door is raised, and the car step is raised when the trap door is lowered.

Still other objects of the invention will appear in the following complete specification, in which the preferred form of the invention is disclosed.

In the drawings similar characters of reference indicate corresponding parts in all the views, in which—

Figure 1 is a sectional elevation showing the portion of a car provided with my car step; Fig. 2 is a view similar to that shown in Fig. 1, but with the car step raised; Fig. 3 is a side elevation of Fig. 1; Fig. 4 is a sectional view on the line 4—4 of Fig. 3; Fig. 5 is an enlarged fragmentary sectional view, showing the locking means for holding members of the car step in position relatively to the car when the tread member is disposed in a horizontal position; and Fig. 6 is a view showing a modified form of connecting means between the trap door and the rod for operating the step.

There has always been difficulty in the construction of passenger cars to so arrange the steps that the passengers may conveniently enter and leave the car while at the same time the steps may be disposed out of the way to prevent their damage when the car is in motion. My invention overcomes this difficulty as the lower step may be lowered and be extended, and as automatic means are provided to operate the step on the movement of a trap door on the car platform, it will be seen that the trainmen will not be obliged to give the movable step any attention. This is so for the trap door must be operated when the train arrives at a station whether my improvement is used or not. When the riser members are lowered they are automatically secured in position to steady the tread member of the movable step.

By referring to the drawings it will be seen that the car 5 is provided with members 6, to which the members 7 are pivoted, these members 7 being provided for carrying the tread member 8, to which is secured a rod 9, which is pivoted to the members 7. Lugs 10 are secured to the members 7, for supporting the tread member 8 when in horizontal position. Secured to the rod 9 there are straps 11, to which are pivoted rods 12, these rods 12 being articulated to the bolts 13, disposed in the guideways 14 in the members 15, secured to the members 7. The bolts 13 are provided for engaging the members 6 at the recesses 16, so that when the members 7 are disposed in the vertical position, the bolts 13 will be moved into the recesses 16 by the downward movement of the tread members 8. This movement of the bolts is obtained by a downward movement of the tread member 8, since the bolts 13 are articulated to the rods 12, which are in turn articulated to the straps 11 which turn with the rod 9, secured to the tread member.

As will best be seen by referring to Fig. 3 of the drawings, the tread member 8 is pivoted between the tread members 7, and as a member 17 projects from the tread member 8, the upward movement of the tread member 8 is limited by the member 17 striking against one of the members 7. To this member 17 there is articulated a link 18, which is connected to an arm 19 of a lever 20 by means of a coupling member 21. This lever 20 is fulcrumed at 22, to a bracket 23, secured to the car 5. The other arm 24 of this lever 20 has a pin 25, which is disposed for sliding in a slot 26 in a link 27, articulated to the bracket 28, secured to the trap door 29 on the car platform. When this trap door is raised, as shown in Fig. 3 of the drawings, it will draw the link 27 upward, so that the link 27 at the end of the slot 26 will engage the pin 25, to operate the lever 20, which will push downward the rod 18 to operate the car step 8 so that it will move to the position shown in Figs. 1 and 5 of the drawings, the downward pressure on the car steps carrying the members 7 to a vertical position. When the members 7 are moved to a vertical position, the guideway 14 will be disposed in alinement with the recess 16, so that when the tread member 8 is moved to a horizontal position it will move with it the rod 9, and the strap 11, to push upward the rod 12, to move the bolt 13 into the recess 16. In this way the members 7 will be prevented from moving out of position when the tread member 8 is disposed horizontally and in the position ready for use. When the trap member 29 is lowered, it will operate the lever 20 in the manner readily understood to draw upward the rod 18, which will move the tread member 8 upward to move the bolts 13 out of the recess 16 by means of the rod 9, the strap 11 and the rod 12, and after this has been done the continued upward movement of the rod 18 will draw up the tread member 8 and the member 7 to a position where they are folded, as shown in Fig. 2 of the drawings. It will of course be understood that the connection between the trap door 29 and the lever 20 may be removed, and that the lever 20 may be operated manually.

In Fig. 6 of the drawings I show a trap door 29ª provided with a guide rod 30 disposed through the eye 31 on the arm 32 of the lever 33 fulcrumed at 34 to the bracket 35, the other arm 36 of this lever 33 being articulated to the rod 18ª.

Having thus described my invention, I claim as new and desire to secure by Letters Patent:—

1. In combination with a car, a member pivoted to the car, a tread member pivoted to the first member and having a projection adapted to strike the first member, when it is folded thereagainst, and a member extending downward and outward, and pivoted to the tread member, so that when the third member is drawn upward and inward it will fold the tread member against the first member and raise the first two members.

2. In combination with a car having a recess, a member pivoted to the car and having a guideway, a tread member pivoted to the first member, a bolt disposed in the guideway and adapted to engage the car at the recess, and means for connecting the bolt to the tread member for operating the bolt by a movement of the tread member.

3. In combination with a car having a recess, a member pivoted to the car having a guideway, a tread member pivoted to the first member and having a projection adapted to strike against the first member, a bolt disposed in the guideway and adapted to engage the car at the recess, means for connecting the bolt to the tread member for operating the bolt by a movement of the tread member, and a third member extending downward and outward and articulated to the tread member, so that when the third member is drawn upward and inward it will fold the tread member against the first member and raise the first two members.

4. In combination with a car, a member pivoted to the car, a tread member pivoted to the first member and having a projection adapted to strike the first member when it is folded thereagainst, a member extending downward and outward and pivoted to the tread member, so that when the third member is drawn upward and inward it will fold the tread member against the first member and raise the first two members, and a lug on the first member for supporting the tread member in horizontal position.

5. In combination with a car having locking means, a member pivoted to the car and having locking means for engaging the locking means on the car, when the member is in a predetermined position relatively thereto, a tread member pivoted to the first member, and means operable by a movement of the tread member relatively to the first member for actuating one of the locking means.

6. In combination with a car having a locking means, a member pivoted to the car and having locking means for engaging the locking means on the car, when the member is in a predetermined position relatively thereto, a tread member pivoted to the first member, and a third member secured to the tread member for moving coaxially therewith, and a link connecting the third member with one of the locking means.

7. In combination with a car having a locking means, a member pivoted to the car and having locking means for engaging the locking means on the car when the member is in a predetermined position relatively thereto, a tread member pivoted to the first member, a third member secured to the tread member for moving coaxially therewith, a link connecting the third member with one of the locking means, a trap door hinged to the car, a guide rod on the trap door, a lever fulcrumed to the car and having an eye on one arm through which the guide arm extends, and a rod secured to the step and operable by the lever.

8. In combination with a car, a member pivoted to the car, a tread member pivoted to the first member, and having a projection adapted to strike the first member, when it is folded thereagainst, a member extending downward and outward, and pivoted to the tread member, so that when the third member is drawn upward and inward it will fold the tread member against the first member and raise the first two members, a lever fulcrumed to the car to one end of which the tread member is secured, a trap door mounted on the car and adapted to move relatively thereto, and means connecting the trap door with the other arm of the lever.

9. In combination with a car having a recess, a member pivoted to the car, a tread member pivoted relatively to the first member, a bolt for moving in the recess, and means operable by one of the members for moving the bolt into the recess.

In testimony whereof I have signed my name to this specification in the presence of two subscribing witnesses.

JOHN R. KUNZELMAN.

Witnesses:
 GEO. S. MALESKI,
 E. J. LANGLOIS.

Copies of this patent may be obtained for five cents each, by addressing the "Commissioner of Patents, Washington, D. C."